US009211909B2

(12) United States Patent
Sharp et al.

(10) Patent No.: US 9,211,909 B2
(45) Date of Patent: Dec. 15, 2015

(54) CONTROLLER AND CONTROL METHOD FOR A MOTORISED VEHICLE

(75) Inventors: Nigel Peter Sharp, Bournemouth (GB); Glenn Leigh Garnett, Southhampton (GB)

(73) Assignee: PENNY & GILES CONTROLS LIMITED, Christchurch, Dorset (GB)

( * ) Notice: Subject to any disclaimer, the term of this patent is extended or adjusted under 35 U.S.C. 154(b) by 915 days.

(21) Appl. No.: 12/727,976

(22) Filed: Mar. 19, 2010

(65) Prior Publication Data

US 2011/0071711 A1    Mar. 24, 2011

(51) Int. Cl.
*B60L 15/00* (2006.01)
*B60L 15/20* (2006.01)
(Continued)

(52) U.S. Cl.
CPC .............. *B62D 11/003* (2013.01); *A61G 5/041* (2013.01); *B60L 15/2009* (2013.01); *B60L 15/2036* (2013.01); *B60L 15/34* (2013.01); *A61G 2203/14* (2013.01); *Y02T 10/7275* (2013.01)

(58) Field of Classification Search
CPC ..................... B60W 10/08; B60W 2510/0638; B60W 2510/0657; B60W 2510/081; B60W 2510/083; B60W 2530/10; B60W 30/188; B60W 30/1888; B60W 2710/0644; B60W 2710/083; B60W 2710/105; B60W 2710/1055; B60W 2710/10; A61G 2203/36; A61G 2203/42; A61G 2203/44; A61G 5/04; B60L 11/00; B60L 15/20; B60L 15/2036; B60L 11/123; B60L 2220/18; B60L 2250/26; H02P 2201/07; H02P 2201/09; Y10S 180/907
See application file for complete search history.

(56) References Cited

U.S. PATENT DOCUMENTS 3,787,723 A * 1/1974 Magnuson et al. ........... 318/823
4,744,018 A * 5/1988 Eccleston ....................... 363/16
(Continued)

FOREIGN PATENT DOCUMENTS

DE    38 26 097 A1    2/1990
GB    2444963A A     6/2008
(Continued)

OTHER PUBLICATIONS

UK Search Report, Appl. No. GB0906863.6 dateed Aug. 12, 2009.
(Continued)

*Primary Examiner* — Ryan Zeender
*Assistant Examiner* — Dana Amsdell
(74) *Attorney, Agent, or Firm* — Haynes Beffel & Wolfeld LLP (57) ABSTRACT

A controller and control method for a motorized vehicle such a wheelchair are provided. The motorized vehicle has at least two driven wheels driven independently by a motor arrangement, and the controller receives a number of input signals from a user input device of the motorized vehicle. The controller comprises drive control circuitry for generating control signals for controlling the driving of the driven wheels by the motor arrangement, the control signals being dependent on the input signals. Speed assist circuitry is responsive to an indication of current consumed in driving the driven wheels to detect occurrence of a loading condition. On detection of occurrence of a loading condition, the speed assist circuitry is then arranged to boost at least one of the input signals in order to boost top speed in the presence of the loading condition. This significantly improves the control of the motorized vehicle in situations where the occurrence of the loading condition may otherwise prevent the vehicle from moving, as for example may occur when seeking to turn the vehicle at low speed.

28 Claims, 7 Drawing Sheets

(51) Int. Cl.
  *B62D 11/00* (2006.01)
  *A61G 5/04* (2013.01)
  *B60L 15/34* (2006.01)
  *B60L 15/10* (2006.01)

(56) References Cited

U.S. PATENT DOCUMENTS

| | | | |
|---|---|---|---|
| 6,041,285 A * | 3/2000 | Young et al. | 702/113 |
| 6,963,145 B2 * | 11/2005 | Richey, II | 307/9.1 |
| 7,770,847 B1 * | 8/2010 | Severson | 246/3 |
| 8,280,569 B2 * | 10/2012 | Kumar et al. | 701/20 |
| 2002/0011361 A1 * | 1/2002 | Richey et al. | 180/6.5 |
| 2003/0159861 A1 * | 8/2003 | Hopper et al. | 180/22 |
| 2004/0040375 A1 * | 3/2004 | Kadota et al. | 73/116 |
| 2004/0195984 A1 * | 10/2004 | Richey, II | 318/109 |
| 2005/0236217 A1 * | 10/2005 | Koelin et al. | 180/411 |
| 2007/0080656 A1 * | 4/2007 | Koerlin | 318/432 |
| 2007/0100511 A1 * | 5/2007 | Koerlin | 701/1 |
| 2008/0115988 A1 * | 5/2008 | Holland | 180/65.6 |

FOREIGN PATENT DOCUMENTS

| | | |
|---|---|---|
| WO | 2007044913 A2 | 4/2007 |
| WO | 2008/065322 A1 | 6/2008 |

OTHER PUBLICATIONS

Extended European Search Report, EP Application No. 10250508.8, dated Sep. 28, 2010.
Rory A Cooper: "Intelligent Control of Power Wheelchairs" IEEE Engineering in Medicine and Biology Magazine, IEEE Service Center, Pisacataway, NJ, US, vol. 14, No. 4, Jul. 1, 1995, pp. 423-431.

* cited by examiner

CONTROLLER AND CONTROL METHOD FOR A MOTORISED VEHICLE

BACKGROUND OF THE INVENTION

1. Field of the Invention

The technology disclosed relates to a controller and a control method for a motorised vehicle, and in particular to the control of a motorised vehicle having at least two driven wheels driven independently by a motor arrangement. In accordance with such motorised vehicles, turning (or spinning) of the vehicle is typically effected by driving the at least two driven wheels in opposite directions. A typical example of such a motorised vehicle is an electric wheelchair.

2. Background of the Invention

Conventional electric wheelchairs have at least two independently driven wheels. Whilst the motor arrangement used to drive the wheels may comprise a single motor with independent couplings between the motor and the wheels to effect independent drive of those wheels, it is more common that each driven wheel is driven by an independent motor. Often the electric wheelchair will include two or more castors which rotate to follow the direction of travel, and optionally a number of further fixed wheels may be provided. The speed and direction of each driven wheel defines a linear forward/reverse speed and the turning rate of the wheelchair.

A typical input control interface for an electric wheelchair provides a joystick having two control axes, one to control the linear/reverse speed and one to control the turn rate (or spin speed). However, it will be appreciated that a joystick is not a requirement, and many other types of input control interface have been developed to allow control by users with a variety of different disabilities, for example head control based mechanisms, sip puff based mechanisms, etc.

The use of 'IR compensation' is common in controllers for motorised vehicles such as electric wheelchairs. IR compensation can be thought of as 'estimated speed control', which generally provides better control of the wheelchair when compared to an open loop system. However, the technique is not perfect and suffers from a number of drawbacks.

In accordance with IR compensation techniques, the speed of the motor is estimated using the following equation:

$$\text{Speed} = k_{emf}(V_m - I_m \times R_m)$$

where:
$K_{emf}$ = Back emf constant
$V_m$ = voltage applied to motor
$I_m$ = Current drawn by motor
$R_m$ = Resistance of motor windings The value of $R_m$ is programmed to a chosen value, and then the current drawn by the motor is monitored. As the current varies the voltage applied to the motor is varied with the aim of keeping the speed constant whilst the user input is indicating a constant speed should be maintained.

A significant drawback is that the motor resistance can vary significantly under normal use (typically due to manufacturing tolerances and variation in operating temperature), and the programmable setting of $R_m$ has to be set to a value low enough to take those variations into account. If this is not done, the speed of the motor can become unstable due to the IR compensation technique, leading to juddering and general instability of the wheelchair.

This intentionally low value of the programmed $R_m$ causes an error in the speed estimation under normal circumstances and this can be particularly significant at low speeds. The end result could be a wheelchair failing to move at all when the speed control is set low, which is disconcerting for the user.

The problem occurs most when the motors are under load and this can be due to the type of surface (e.g. thick carpet), the castor assembly design, the user weight, an obstacle, etc. The turn (or spin) axis is particularly susceptible to this problem, as realignment of the castors can require significant torque.

Due to the desire to produce motorised vehicles such as electric wheelchairs as cheaply as possible, it is common to use low cost components such as low cost motors. The above discussed problems become even more significant when low cost motors are used, since such motors usually have high resistance windings that heat up under normal use and then have an even higher resistance.

It would hence be desirable to provide an improved technique for controlling motorised vehicles that alleviates the above-discussed problems.

SUMMARY OF THE INVENTION

Viewed from a first aspect, the technology disclosed provides a controller for a motorised vehicle having at least two driven wheels driven independently by a motor arrangement, the controller being arranged to receive a number of input signals from a user input device of the motorised vehicle, the controller comprising: drive control circuitry for generating control signals for controlling the driving of said at least two driven wheels by the motor arrangement, said control signals being dependent on the input signals; and speed assist circuitry, responsive to an indication of current consumed in driving at least one of said at least two driven wheels, to detect occurrence of a loading condition; on detection of occurrence of said loading condition, said speed assist circuitry being arranged to boost at least one of the input signals in order to boost top speed in the presence of said loading condition.

In accordance with the technology disclosed, speed assist circuitry is arranged to detect occurrence of a loading condition having regards to an indication of current consumed in driving at least one of the driven wheels of the motorised vehicle. On detection of occurrence of the loading condition, the speed assist circuitry then boosts at least one of the input signals in order to boost top speed in the presence of the loading condition. By boosting at least one of the input signals, this will affect the control signals generated by the drive control circuitry in order to control the driving of the driven wheels. Such a mechanism thus provides positive feedback to the system on a much slower time frame than IR compensation techniques, since such boosting of the input signals will be naturally damped by the drive algorithms used by the drive control circuitry to generate the control signals.

The technique of the technology disclosed can be used instead of, or in addition to, IR compensation techniques. Where the technique of the technology disclosed is used in combination with IR compensation techniques, the use of the technology disclosed allows the error in IR compensation to be significantly compensated for, while maintaining stability and control of the motorised vehicle.

There are a number of choices as to the input signals which could be boosted in order to boost the top speed in the presence of the loading condition. However, in one embodiment the input signals include a top speed setting selectable via the user input device. In such cases, the control signals generated by the drive control circuitry will be dependent on the top speed setting. In such embodiments, on detection of occurrence of the loading condition, the speed assist circuitry can be arranged to boost the top speed setting selected via the user input device, which will have the effect of boosting top speed in the presence of the loading condition.

Boosting of the top speed setting selected by the user can be achieved either by boosting that top speed setting directly, or by boosting another setting used to derive the value attributed to the top speed setting. For example, it is often the case that the user input device of the motorised vehicle will provide a top speed setting input mechanism allowing the top speed setting to be selected between a minimum top speed setting and a maximum top speed setting. The actual value given to the selected top speed setting is determined by interpolating between the minimum top speed setting and the maximum top speed setting. In such embodiments, the speed assist circuitry may be arranged on detection of occurrence of said loading condition to raise the minimum top speed setting to create a new minimum top speed setting, such that the amount of boost applied to the top speed setting selected via the user input device is dependent on the value of that selected top speed setting.

In particular, in accordance with such techniques, it will be seen that the degree of boosting applied will increase the lower the top speed setting selected by the user. For example, if the top speed setting selected by the user is close to the minimum top speed setting, then it will be more significantly boosted by the raising of the minimum top speed setting than would be the case if the top speed setting selected by the user were nearer the maximum top speed setting. This has been found to be particularly beneficial, since it is often the case that the earlier mentioned problems in operation of the motorised vehicle occur when the top speed setting is set to a low value, due to the loading condition being more likely to occur in such instances (because of the lower torque available from the motor arrangement).

There are a number of ways in which the minimum top speed setting can be raised on detection of the loading condition. In one embodiment, the speed assist circuitry is arranged to calculate the new minimum top speed setting by multiplying the minimum top speed setting by a scalar of at least one, the value of the scalar increasing as the current consumed in driving at least one of the at least two driven wheels increases. The manner in which the scalar increases as the current consumed in driving the driven wheels increases can be arranged in a variety of ways, but in one embodiment the value of the scalar increases linearly with increase in the current consumed in driving the driven wheels.

In one embodiment, the manner in which the scalar increases as the current consumed in driving the driven wheels increases can be fixed, but in an alternative embodiment, that function is programmable. In particular, in one embodiment the controller further comprises a storage for storing a programmable value, the rate at which the value of the scalar increases as the current consumed in driving at least one of the at least two driven wheels increases being dependent on said programmable value. This allows the distributor of the motorised vehicle, and even the end user if desired, to change the programmable value as desired, with the aim of achieving a desired control response from the motorised vehicle.

In one embodiment, when calculating the new minimum top speed setting, the speed assist circuitry restricts the new minimum top speed setting so as not to exceed the maximum speed attainable through said at least two driven wheels. Typically the minimum top speed and maximum top speed settings will be specified as a percentage of the maximum speed obtainable through the driven wheels, i.e. the maximum output from the motors. Hence, the maximum output from the motors will typically be considered to represent 100%, and both the maximum top speed and minimum top speed will be specified as a percentage of that maximum. It should be noted that whilst the maximum top speed setting may be set to 100%, there is no requirement for the maximum top speed to be set to 100% and indeed it is often the case that at least the top speed setting for travelling in reverse and the top speed setting for turning are chosen to be less then 100%. When calculating the new minimum top speed setting, it will be appreciated that it is possible that the calculated new value will exceed 100%, and in those instances the minimum top speed setting is then limited so as not to exceed 100%.

In one embodiment, if the new minimum top speed setting exceeds the maximum top speed setting, the speed assist circuitry is arranged to set the maximum top speed setting to be equal to the new minimum top speed setting. In that instance, it will be appreciated that the top speed setting control on the input device provides no variability during the time that the minimum top speed setting and maximum top speed setting are equal. However, the aim of boosting the top speed setting using the speed assist mechanism is to seek to overcome the loading condition, and as the loading condition is overcome the current drawn will naturally reduce, causing the minimum top speed setting to subsequently reduce. The maximum top speed setting will reduce with the minimum top speed setting until it reaches its original value, where it will then stay whilst the minimum top speed setting continues to reduce.

The speed assist circuitry can be arranged to operate under a variety of conditions. For example, the speed assist circuitry may be activated for the entire duration that the motorised vehicle is being used, or alternatively may be utilised only if at least one predetermined condition exists. For example, in one embodiment, such a predetermined condition may comprise a condition under which the at least two driven wheels are being driven so as to apply a turning force to the motorised vehicle. Accordingly, in such embodiments, the speed assist circuitry is only utilised whilst a turning operation of the vehicle is being performed, and if the vehicle is being driven in a straight line (either forward or backward) then the speed assist circuitry does not detect occurrence of the loading condition (either by not operating during those periods, or by not performing any boosting of the input signals dependent on any information processed).

The motor arrangement used to drive the at least two driven wheels may take a variety of forms. However, in one embodiment the motor arrangement comprises at least two independent motors for driving said at least two driven wheels, and the at least two driven wheels are driven so as to apply said turning force to the motorised vehicle by driving the at least two independent motors in opposite directions to each other.

In one such embodiment, the indication of current provided to the speed assist circuitry is an indication of a sum of the absolute value of current consumption in each of said independent motors.

The top speed setting selectable via the user input device can take a variety of forms. In one embodiment, the top speed setting as entered by the user may be used to determine a variety of separate top speed settings, for example, a forward top speed setting, a reverse top speed setting and a turn top speed setting. These settings will not typically be the same, since for example it is often desired to limit the reverse top speed to a top speed less then the forward top speed, and similarly the turn top speed is usually set to a lower level than the forward top speed. Whilst the speed assist circuitry may be utilised to boost any of these individual top speed components, in one embodiment, the speed assist circuitry is arranged to boost the top turn speed setting on detection of occurrence of the loading condition. In particular, many of the earlier mentioned problems that can arise when operating the motorised vehicle at low speed, resulting for example in the vehicle failing to move at all under certain situations, often arise in performing turn operations, and accordingly it is particularly beneficial to employ the technique of embodiments to the technology disclosed to boost the top turn speed setting under loading conditions that arise during the performance of such turning operations.

In one embodiment, the top turn speed setting is selectable between a minimum top turn speed setting and a maximum top turn speed setting, and the speed assist circuitry is arranged on detection of occurrence of said loading condition to raise the minimum top turn speed setting to create a new minimum top turn speed setting, such that the amount of boost applied to the top turn speed setting selected via the user input device is dependent on the value of that selected top turn speed setting. Accordingly, by such an approach, a higher boost to the top turn speed setting occurs when that top turn speed setting is relatively low than occurs when that top turn speed setting is nearer the maximum top turn speed setting.

Whilst in one embodiment of the present invention, the speed assist circuitry determines the occurrence of the loading condition having regards solely to the indication of current consumed in driving the driven wheels, in an alternative embodiment one or more predetermined operational parameters can also be taken into account.

In one particular embodiment, one such predetermined operational parameter comprises an indication of operating temperature of one or more motors of the motor arrangement used to drive said at least two driven wheels. By such an approach, the technique can be extended to take account of inaccuracies that occur due to the motors heating up and becoming less efficient. In particular, by such an approach, the technique can allow for fluctuations in motor temperature, either by measuring the motor temperature directly, or by estimating it through a mathematical model.

There are a number of ways in which the loading condition can be detected. However, in one embodiment, the speed assist circuitry detects said loading condition when the current consumed in driving at least one of said at least two driven wheels increases. Through the boosting operation of the technology disclosed, the loading condition will typically be overcome, as a result of which the current consumed in driving the driven wheels will then begin to decrease again, allowing the boosting operation to be reversed. For example, using embodiments where the minimum top speed setting is raised on observation of the loading condition, the same calculation performed to raise the minimum top speed setting during the occurrence of the loading condition will naturally cause the minimum top speed setting to be reduced again when the current consumed starts to drop following the overcoming of the loading condition.

The loading condition can arise for a variety of reasons. For example, in one embodiment the loading condition arises due to one or more of the following events increasing the loading on at least one of the driven wheels: friction between at least one of said at least two driven wheels and a surface on which the motorised vehicle is placed when seeking to turn the motorised vehicle; a required re-alignment of castor wheels of the motorised vehicle when seeking to turn the motorised vehicle; weight of the user; contact of the motorised vehicle with an abrupt change in contour of said surface on which the motorised vehicle is placed.

It will be appreciated that the above list is not intended to be an exhaustive list, and it will be appreciated that a number of other events may give rise to the loading condition being observed.

Whilst the speed assist circuitry may be arranged to detect occurrence of the loading condition having regard to an indication of the current consumed by only a subset of the driven wheels, in one embodiment the speed assist circuitry is arranged to detect occurrence of the loading condition having regard to an indication of total current consumed in all of said at least two driven wheels. In such embodiments, the absolute current values consumed by each motor are summed to produce the total current used by the speed assist circuitry.

Viewed from a second aspect, the technology disclosed provides a motorised vehicle comprising: a motor arrangement; at least two driven wheels driven independently by said motor arrangement; a user input device via which a user issues a number of input signals; and a controller in accordance with the first aspect of the technology disclosed for controlling the driving of said at least two driven wheels dependent on said input signals.

The motorised vehicle may take a variety of forms, but in one embodiment the motorised vehicle is a wheelchair. The techniques of embodiments of the technology disclosed are particularly beneficial when used in electric wheelchairs, which often make use of motors which give rise to the loading conditions that the techniques of embodiments of the technology disclosed seek to alleviate.

Viewed from a third aspect, the technology disclosed provides a method of controlling a motorised vehicle having at least two driven wheels driven independently by a motor arrangement, comprising the steps of: receiving a number of input signals from a user input device of the motorised vehicle; generating control signals for controlling the driving of said at least two driven wheels by the motor arrangement, said control signals being dependent on the input signals; responsive to an indication of current consumed in driving at least one of said at least two driven wheels, detecting occurrence of a loading condition; and on detection of occurrence of said loading condition, boosting at least one of the input signals in order to boost top speed in the presence of said loading condition.

Viewed from a fourth aspect, the technology disclosed provides a computer program product comprising a computer program which when executed on a computing device causes a motorised vehicle having at least two driven wheels driven independently by a motor arrangement to be controlled in accordance with the third aspect of the technology disclosed.

Viewed from a fifth aspect, the technology disclosed provides a controller for a motorised vehicle having at least two driven wheels driven independently by a motor arrangement, the controller being arranged to receive a number of input signals from a user input device of the motorised vehicle, the controller comprising: drive control means for generating control signals for controlling the driving of said at least two driven wheels by the motor arrangement, said control signals being dependent on the input signals; and speed assist means, responsive to an indication of current consumed in driving at least one of said at least two driven wheels, for detecting occurrence of a loading condition; on detection of occurrence of said loading condition, said speed assist means for boosting at least one of the input signals in order to boost top speed in the presence of said loading condition.

BRIEF DESCRIPTION OF THE DRAWINGS

The technology disclosed will be described further, by way of example only, with reference to embodiments thereof as illustrated in the accompanying drawings, in which.

DESCRIPTION OF EMBODIMENTS

Figure 1:
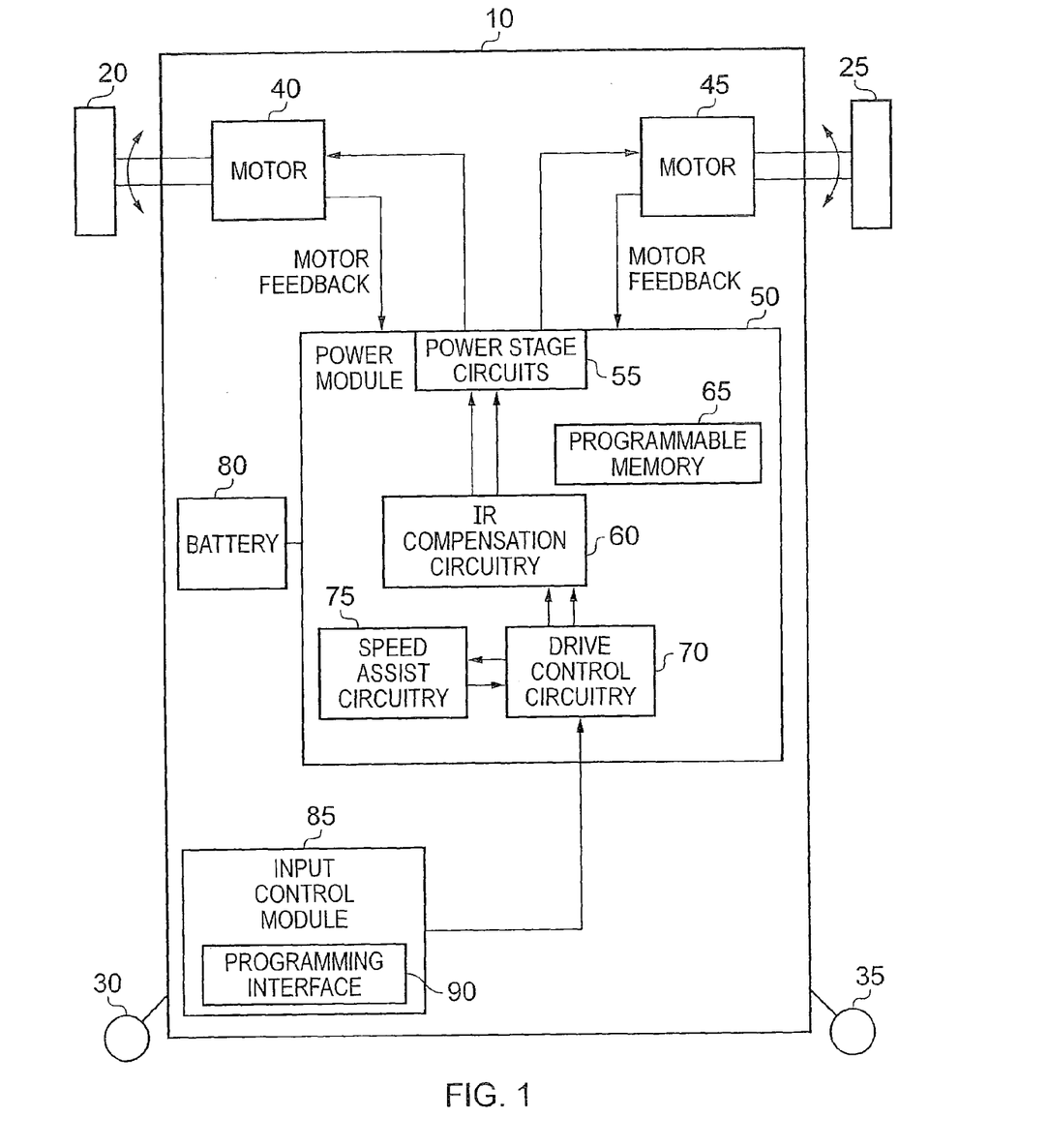
FIG. 1 is a block diagram of a motorised vehicle in accordance with one embodiment of the technology disclosed.

FIG. 1 is a block diagram of a motorised vehicle in accordance with one embodiment of the technology disclosed. For the purposes of the following discussion, the example where the motorised vehicle is an electric wheelchair will be used. In the example of FIG. 1, the electric wheelchair has a chassis 10 to which two motor driven wheels 20, 25 are connected. Further, a pair of castors 30, 35 are also provided on the front of the wheelchair which rotate to follow the direction of travel of the wheelchair. Each of the two motor driven wheels 20, 25 are driven independently by a motor arrangement. In the embodiment illustrated, each driven wheel 20, 25 is driven by a separate motor 40, 45, respectively. To make the vehicle move forward or backward both wheels are driven in the same direction, whilst to effect a turning of the wheelchair, the two driven wheels 20, 25 are driven in opposing directions.

Whilst in FIG. 1 the driven wheels are provided to the rear of the wheelchair and the castors 30, 35 are provided towards the front, it will be appreciated that in alternative embodiments the driven wheels may be at the front and the castors may be at the rear. Indeed, in further embodiments the driven wheels may be provided in the middle of the wheelchair, with a selection of castors and other fixed but non-driven wheels also being provided to stabilise the wheelchair chassis 10.

As shown in FIG. 1, a power module 50 is provided on the wheelchair chassis 10 which is coupled to an input control module 85 via which a user of the wheelchair can enter drive commands. Whilst the power module 50 and input control module 85 are shown as separate elements, it will be appreciated that in some embodiments both these modules may be incorporated into a single housing.

All of the electrical components on the wheelchair receive power from an on-board battery 80, which is typically a heavy duty re-chargeable battery capable of providing the relatively large currents used to drive the motors 40, 45 during operation of the wheelchair.

The power module 50 includes drive control circuitry 70 which is responsive to input signals received from the input control module 85 to generate left and right motor demand control signals which are then output to optional IR compensation circuitry 60. Such IR compensation circuitry may be arranged in a standard manner to perform the earlier-mentioned IR compensation techniques to seek to provide improved control of the wheelchair. The control signals as modified by the optional IR compensation circuitry 60 are then forwarded to power stage circuits 55 which are used to generate the required driving voltages for the motors 40, 45 in order to seek to produce the desired motion. In the absence of IR compensation circuitry 60, the output signals from the drive control circuitry 70 may be provided directly to the power stage circuits 55.

Programmable memory 65 is also provided within the power module, which can be arranged to store a number of programmable values referred to by components of the power module during operation of the wheelchair. The values stored in the programmable memory can be programmed through a programming interface 90, which in the embodiment of FIG. 1 is provided within the input control module 85. However, it will be appreciated that the programming interface 90 can be located at any suitable location on the wheelchair, and there is no requirement for the programming interface to be provided as part as the input control module 85.

In accordance with embodiments of the technology disclosed, speed assist circuitry 75 is also provided which operates under one or more predetermined conditions to boost a top speed setting selected via the input control module with the aim of overcoming a detected loading condition, as arises when the motors are under load in a variety of situations, e.g. due to properties of the surface on which the wheelchair is located (for example when seeking to turn on thick carpet), the castor assembly design (significant loading occurs when the castors need to be realigned with the intended direction of travel), user weight (the heavier the user, then the more the load on the motors), contact with an obstacle such as a curb, etc. Whilst the speed assist circuitry can be arranged to be operational during all manoeuvres of the wheelchair, in one embodiment the use of the speed assist circuitry is restricted to situations where the wheels 20, 25 are being driven in opposite directions so as to effect turning of the wheelchair, since under such turn conditions the problems arising from such loading conditions are most likely to occur.

As shown in FIG. 1, motor feedback signals are provided from each of the motors 40, 45 to the power module 50, these signals providing information about the current being consumed by each of the motors. This information is used by a variety of components within the power module 50. For example, such current information is used by the IR compensation circuitry 60 to determine any modification to the voltage supplied to the motors. Further, such current consumption information is used by the drive circuitry 70 to determine when to use the speed assist circuitry 75. In addition, as will be discussed in more detail later, the current consumption is used by the speed assist circuitry in order to decide on the boosting to be applied to the top speed setting under occurrence of a loading condition.

Whilst the drive circuitry 70, speed assist circuitry 75 and IR compensation circuitry 60 may be embodied by dedicated circuits within the power module, in one embodiment the functions of these circuits may be performed via a central processing unit (CPU) running appropriate software routines.

Figure 2A:
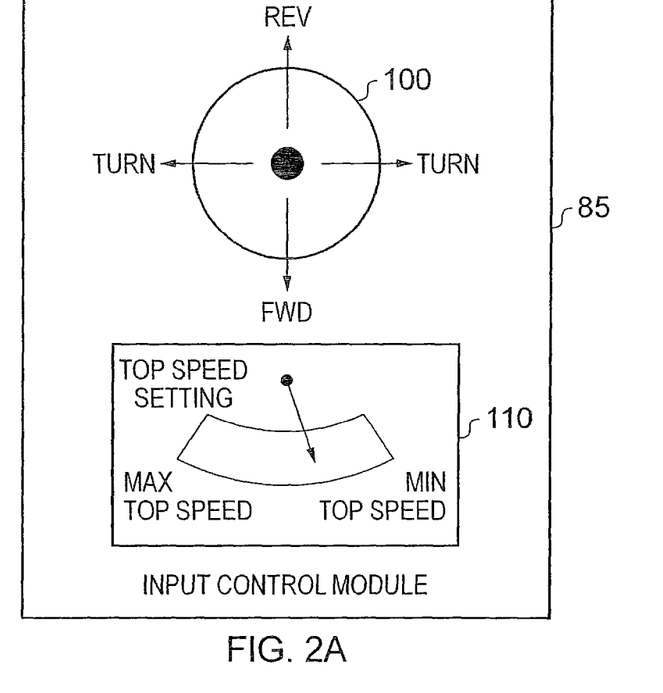
FIG. 2A is a diagram illustrating the input control module used in accordance with one embodiment of the technology disclosed, and FIG. 2B schematically illustrates various independent top speed settings that can be determined from the top speed setting input via the input control module of FIG. 2A.

FIG. 2A schematically illustrates the input control module 85 of FIG. 1 in accordance with one embodiment. In this embodiment, two input devices are provided within the input control module, namely a joystick 100 and a dial 110. The joystick 100 operates in a known manner to allow a user to indicate a general direction of travel and also the relative speed of travel with reference to a selected top speed. Hence, deflecting the joystick on the y axis will identify a degree of forward or reverse motion required, whilst any deflection on the x axis will indicate the requirement for a turning operation either to the right or the left, with the amount of deflection indicating the speed of that turning operation required. As will be appreciated by those skilled in the art, the joystick may be deflected anywhere within the circle shown by element 100 so as to specify any combination of forward/reverse and turning operation.

The dial 110 used to specify a top speed setting allows the user to specify a top speed setting anywhere between a maximum top speed and a minimum top speed setting, and interpolation between the maximum top speed setting and the minimum top speed setting is used to determine the actual selected top speed setting. Both the maximum top speed setting and the minimum top speed setting can be set as a certain percentage of the absolute maximum output available from the relevant motor 40, 45, this absolute maximum being referred to hereafter as 100%.

Figure 2B:
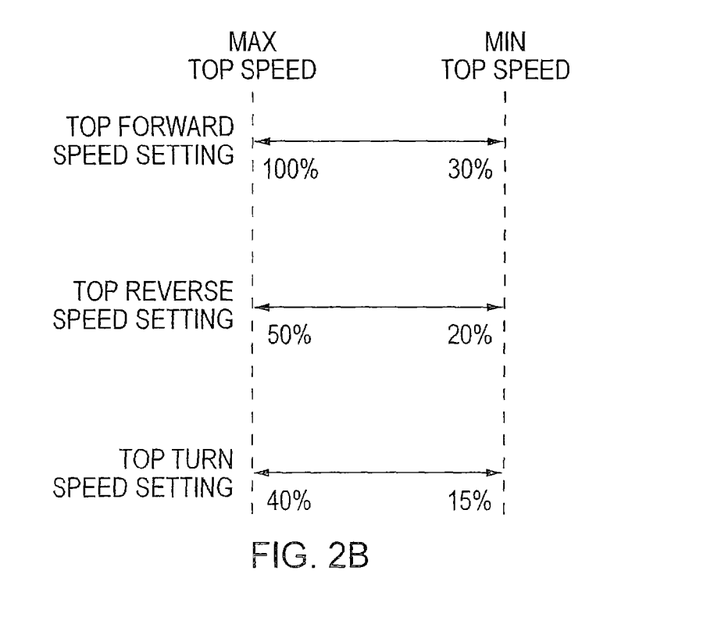

As shown in FIG. 2B, the top speed setting selected by the user using the dial 110 is actually used to determine top speed settings for a number of directions of travel. In particular, it is used to determine a forward top speed setting, a reverse top speed setting and a turn top speed setting having regards to maximum and minimum top speed settings for each of these three directions programmed into the programmable memory 65. These maximum and minimum values need not be the same for each of the directions of travel, as illustrated schematically in FIG. 2B. Accordingly in the example illustrated, the forward top speed setting can change between 30% when the dial 110 is set to the minimum top speed setting, up to 100% when the dial is set to the maximum top speed setting. However, whilst it is often the case that 100% will be set as the maximum top speed for forward motion, it is very unlikely that 100% will be set as the maximum speed for either reverse or turning motion. Accordingly, merely by way of illustration, the range specified for reverse top speed settings may vary between 20% and 50% whilst the range for turn top speed settings may range between 15% and 40%. It will be appreciated that the percentages quoted in FIG. 2B are merely for the purpose of illustration, and can be set to any value desired between 0 and 100%.

The maximum top speed is defined as the percentage of full speed for each drive wheel when the joystick is fully deflected in the relevant direction, and the speed control is set to maximum. Hence, considering the maximum top turn speed, this is defined as the percentage of full speed for each drive wheel when the joystick is fully deflected on it x-axis, and the speed control is set to maximum. In this instance, the two drive wheels will be driving in opposite directions.

Similarly the minimum top speed is defined as the percentage of full speed for each drive wheel when the joystick is fully deflected on its relevant axis, and the speed control is set to minimum. Hence again, considering minimum top turn speed, this will be defined as the percentage of full speed for each drive wheel when the joystick is fully deflected on its x-axis and the speed control is set to minimum. In this instance the two drive wheels will again be driving in opposite directions.

Whilst a joystick 100 is shown in FIG. 2A, it will be appreciated that there is no requirement for the use of such a joystick, and instead any other suitable mechanism for allowing the user to enter a desired direction of travel may be provided. For example, for users having a degree of paralysis, it is known to provide other input mechanisms such as head controls or sip puff controls.

Similarly the top speed setting unit 110 need not be a dial such as a rotary potentiometer. Instead, in other embodiments, any other suitable top speed setting mechanism, such as the use of push buttons and a display, may be used in order to allow the user to specify a top speed setting.

As will be discussed in more detail below, the speed assist circuitry 75 of embodiments of the technology disclosed is used to boost the top turn speed setting under the occurrence of certain loading conditions. This could be done by seeking to directly modify the top speed setting selected by the user. However, as will be discussed in more detail below, in one embodiment of the technology disclosed it is instead achieved by boosting the minimum top turn speed setting. This has the benefit that the effective boost provided to the top speed setting selected by the user is greater the nearer that selected top speed setting is to the minimum top speed, and the boost becomes progressively less as the selected top speed setting is closer to the maximum top speed. This is due to the fact that as the minimum top turn speed setting is increased, the difference between the maximum top turn speed and minimum top turn speed is reduced, and the interpolation that takes place between those two specified speeds to determine the selected top speed setting will naturally produce a bigger boost for lower selected top speed settings. This is beneficial as the manoeuvrability problems that the use of the speed assist circuitry is attempting to alleviate most commonly occur at low speeds.

Whilst the remainder of the embodiment description will concentrate on the embodiment where the minimum top speed setting is boosted to effect the boosting of the top speed setting, it will be appreciated that in other embodiments the top speed setting could be boosted directly as mentioned earlier. Indeed, alternatively, the top speed setting as selected by the input device 110 could be left unamended, and the input provided by the joystick 100 or alternative input mechanism could be boosted to in effect boost the top turn speed in the presence of a loading condition.

Figure 3:
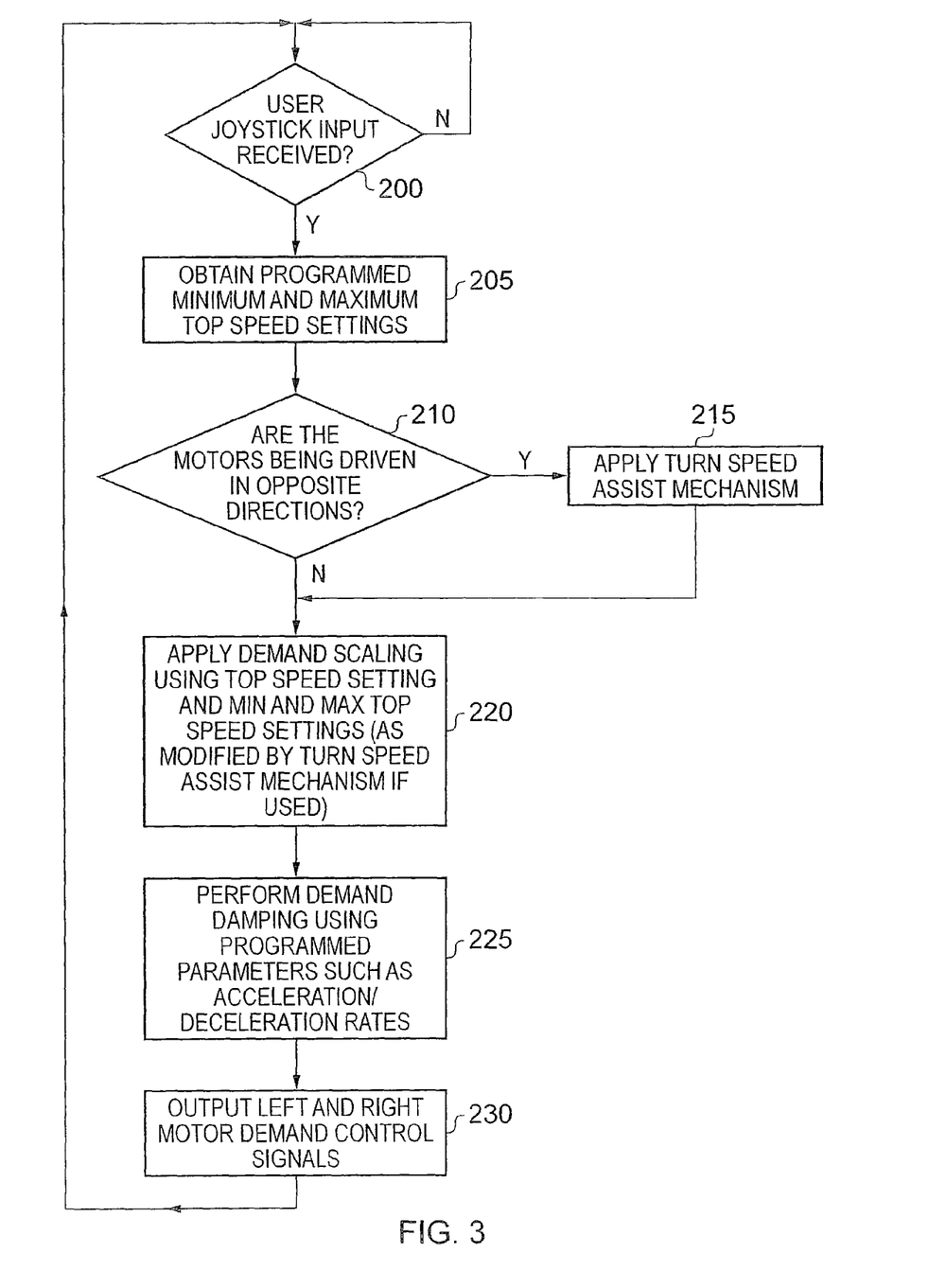
FIG. 3 is a flow diagram illustrating the steps performed by the drive control circuitry and speed assist circuitry of FIG. 1 in accordance with one embodiment of the technology disclosed.

FIG. 3 is a flow diagram illustrating the operation of the drive control circuitry 70 and associated speed assist circuitry 75 upon receipt of input signals from the input control module 85. At step 200, input from the user via the joystick 100 is awaited, and on receipt of such input the programmed minimum and maximum top speed settings are obtained at step 205 from the programmable memory 65. As discussed earlier, these will include the maximum and minimum speed settings for forward, reverse and turn directions of travel.

Thereafter, at step 210, the drive control circuitry 70 determines whether the motors are being driven in opposite directions. This is determined with reference to the motor feedback signals from the two motors 40, 45. If the motors are being driven in opposite directions, then the process branches to step 215, where the turn speed assist mechanism implemented by the speed assist circuitry 75 is utilised, which may result in the modification of the minimum top turn speed setting, and potentially the maximum top turn speed setting, as will be discussed in more detail later with reference to FIG. 4.

If the motors are not being driven in opposite directions, then the speed assist circuitry is not used, and the process proceeds directly to step 220. Alternatively, the process will proceed to step 220 after the speed assist circuitry has applied the turn speed assist mechanism at step 215. At step 220, standard demand scaling techniques are used to identify the desired direction and speed of travel represented by the user's input from the joystick. During this process, the top speed setting selected by the user using the dial 110, along with the above mentioned maximum and minimum top speed settings (as modified by the turn speed assist mechanism if used) are employed. Such demand scaling techniques are well known, and accordingly will not be discussed in more detail herein.

Following the demand scaling operation, the drive control circuitry 70 then performs a demand damping operation using programmed parameters stored within the programmable memory 65 such as acceleration and deceleration rates. Such demand damping operations are well known and will hence not be discussed further herein, and serve to ensure smooth transitions in speed so as to avoid any extremes of acceleration and deceleration.

Thereafter at step 230, the resultant computed left and right motor demand control signals are output by the drive control circuitry 70. These may be applied directly to the power stage 55, or as shown in FIG. 1 may be routed via standard IR compensation circuitry 60 to perform known IR compensation techniques. Thereafter, the process returns to step 200 to wait further user input via the joystick.

It will appreciated from FIG. 3 that the operation of the turn speed assist mechanism is included within the loop between steps 200 and 230 and hence provides a positive feedback to the system on a much slower time frame, naturally damped by the drive algorithms used when performing the demand damping step of step 225, than is possible when using IR compensation techniques. This allows the errors in the IR compensation technique which result from the intentionally low value of the programmed resistance $R_m$ in such IR compensation mechanisms to be significantly compensated for, whilst maintaining stability of control. Hence, the standard IR compensation techniques can continue to be employed by the circuitry 60, and the additional use of the speed assist circuitry 75 removes many of the speed estimate errors which can cause manoeuvrability problems in known wheelchairs using just IR compensation techniques. Indeed, the techniques of the speed assist circuitry of embodiments of the technology disclosed can also be used in systems where no IR compensation is performed, providing significantly enhanced control.

Figure 4:
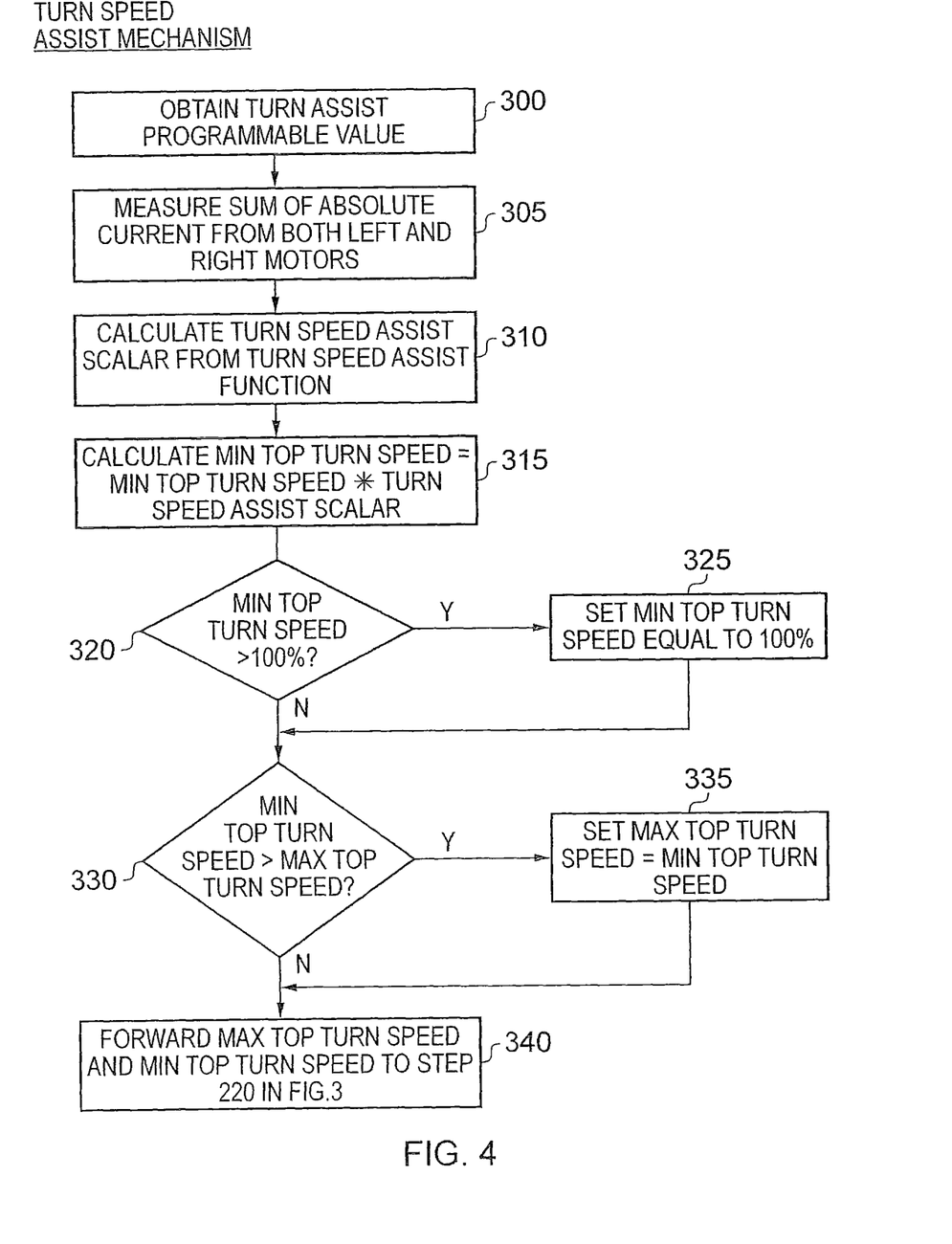
FIG. 4 is flow diagram illustrating in more detail the operation of the speed assist circuitry of FIG. 1 in accordance with one embodiment of the technology disclosed.

FIG. 4 is a flow diagram describing in more detail the operation of the turn speed assist mechanism of step 215 of FIG. 3. At step 300, a turn assist programmable value is read from the programmable memory 65, this turn assist programmable value being programmable between 0 and 100 in one embodiment of the technology disclosed, as illustrated in FIG. 5.

At step 305, the sum of the absolute current from both the left and right motors is measured, the speed assist circuitry 75 determining this from the combination of the motor feedback signals provided from the motors 40 and 45. As discussed earlier, the speed assist circuitry is only used when a turn operation is seeking to be performed, i.e. the two drive wheels are seeking to be driven in opposite directions, and accordingly when computing the total motor current it is necessary to use the absolute values of current from both the left and right motors and to then sum those absolute values in order to obtain the total motor current.

Figure 5:
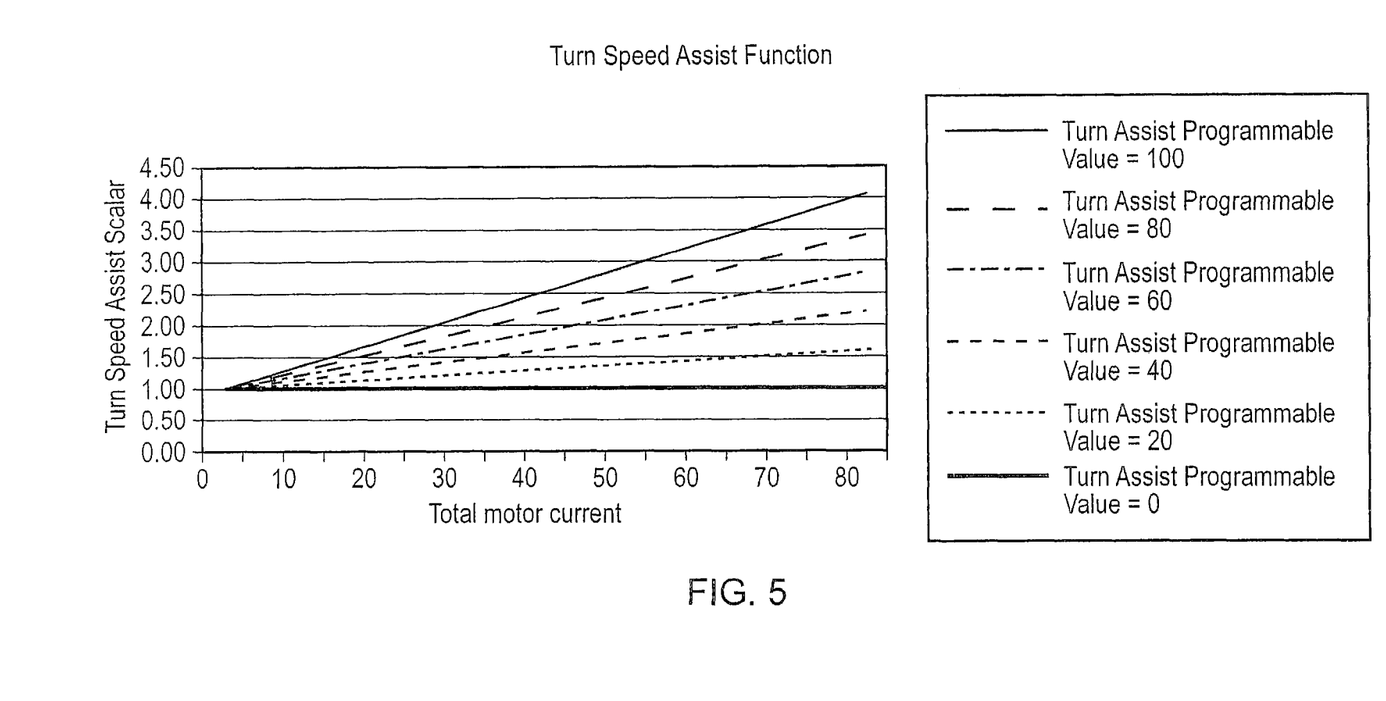
FIG. 5 is a diagram schematically illustrating the turning speed assist function used when performing the process of FIG. 4 in accordance with one embodiment of the preset invention.

At step 310, the speed assist circuitry 75 then calculates a turn speed assist scalar using a turn speed assist function as illustrated schematically in FIG. 5. In particular, using the total motor current and the turn assist programmable value, a turn speed assist scalar can then be determined. As shown in FIG. 5, the higher the turn assist programmable value, then the greater the turn speed assist scalar will be for any particular total motor current.

Whilst in FIG. 5 the lines representing the relationship between total motor current and turn speed assist scalar for each of the illustrated turn assist programmable values are straight, thereby identifying a linear relationship between turn speed assist scalar and total motor current, there is no requirement for such a linear function, and any suitable function can be used. However, whichever function is chosen, the aim is to increase the turn speed assist scalar with motor current.

Following step 310, the speed assist circuitry 75 then performs the following computation:

$$\text{Minimum top turn speed} = \text{minimum top turn speed} \times \text{turn speed assist scalar.}$$

From FIG. 5, it will be seen that if the turn assist programmable value is 0, then this computation has no effect and the minimum top turn speed remains the same for any total motor current. However, for all other values of turn assist programmable value, this computation will cause the minimum top turn speed to increase as the total motor current increases.

At step 320, it is determined whether the minimum top turn speed calculated at step 315 is greater then 100%, i.e. greater than the maximum output available from the motors. If it is, then the process branches to step 325 where the minimum top turn speed is set equal to 100%, whereafter the process proceeds to step 330. Otherwise, the process proceeds directly from step 320 to step 330.

At step 330, it is determined whether the minimum top turn speed as calculated at step 315 is now greater than the maximum top turn speed. For example, considering the illustration in FIG. 2B, the maximum top turn speed was set to 40% and the minimum top turn speed was set to 15%. At some point it is possible that the minimum top turn speed as calculated at step 315 will exceed 40%. In that event, then it will be determined at step 330 that the minimum top turn speed now exceeds the maximum top turn speed, and the process will branch to step 335. At step 335, the maximum top turn speed is set equal to the minimum top turn speed. Hence this avoids the minimum top turn speed overtaking the maximum top turn speed. Thereafter, the process proceeds to step 340. Otherwise, the process proceeds directly from step 330 to step 340 if the minimum top turn speed is not greater than the maximum top turn speed.

At step 340, the maximum top turn speed and the minimum top turn speed are forwarded to step 220 of FIG. 3, i.e. are input from the speed assist circuitry 75 to the drive control circuitry 70 to enable the drive control circuitry to perform the demand scaling operations discussed earlier.

From the above description of FIGS. 3 to 5, it will be seen that the turn speed assist mechanism of embodiments of the technology disclosed causes the minimum top speed setting, and hence the top speed setting selected by the user, to be boosted during turn operations in situations where the current consumed by the motors rises due to the presence of a loading condition. Boosting the top speed setting tends to overcome the loading condition, and as the loading condition is overcome the current drawn will naturally reduce, causing the minimum top speed setting to subsequently reduce. It is worth noting that the process of FIG. 4 is performed during each iteration of the process of FIG. 3 whilst the motors are being driven in opposite directions. Hence, even if on one iteration the maximum top speed setting is changed at step 335, on each new iteration of FIG. 3 the default starting point for the maximum top speed setting (and indeed the minimum top speed setting) will be that obtained from the memory 65 at step 205. Hence, the maximum top speed setting is only increased whilst the minimum top speed setting is determined at step 330 to be greater than the maximum top speed setting, and otherwise is left unamended.

It will be appreciated that the numbers giving in the example of FIG. 5 are merely for the purposes of illustration. In the example of FIG. 5, it is assumed that the maximum total current is 80 amps, but the function can be tuned to the true maximum total current of the particular system in which the technique is utilised.

Further, in the above discussion, it is assumed that the speed assist circuitry is only utilised in association with turn operations, and in particular is only used when the motors are being driven in opposite directions. However, the speed assist mechanism can also be used in other situations, for example when driving over a small curb at low speeds, where the motors will in fact be driving in the same direction. Through use of the above described techniques, it is possible in such situations to boost the minimum top forward speed setting or minimum top reverse speed setting as appropriate in order to allow the wheelchair to move over the curb in situations where it might otherwise stop.

Figure 6A:
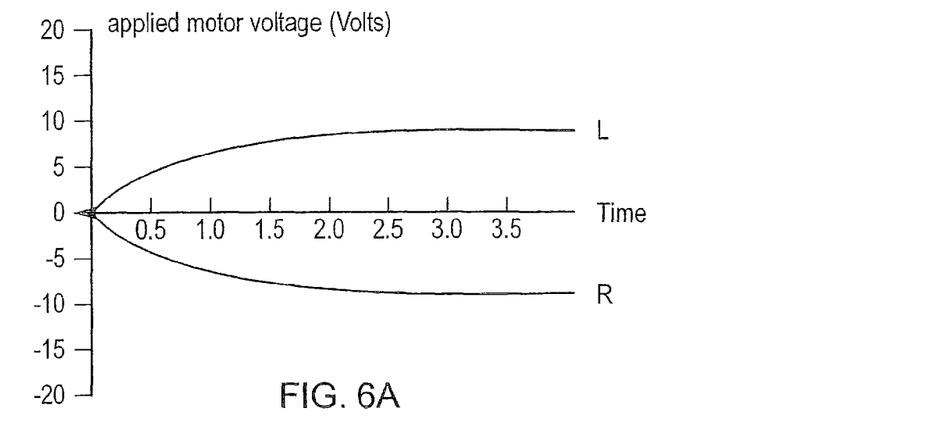
FIGS. 6A to 6C are graphs illustrating how motor voltage, motor current and motor speed vary under a loading condition during a turn operation in accordance with a known prior art technique.
Figure 6B:
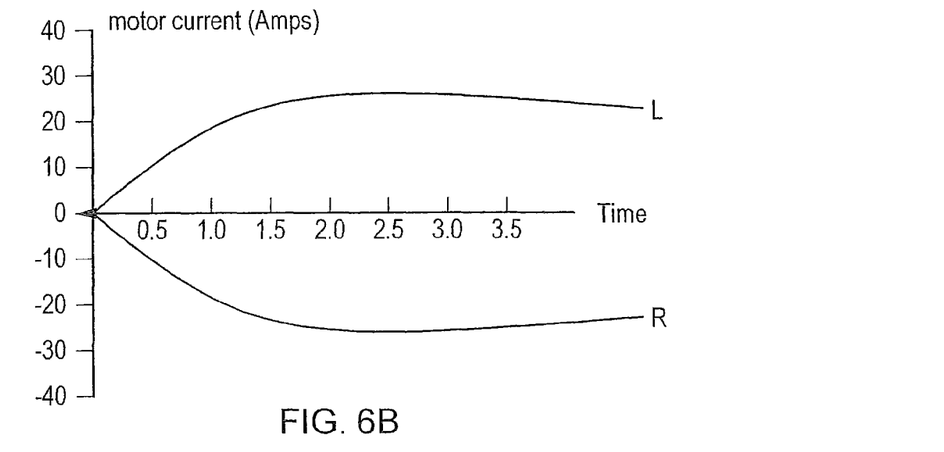
Figure 6C:
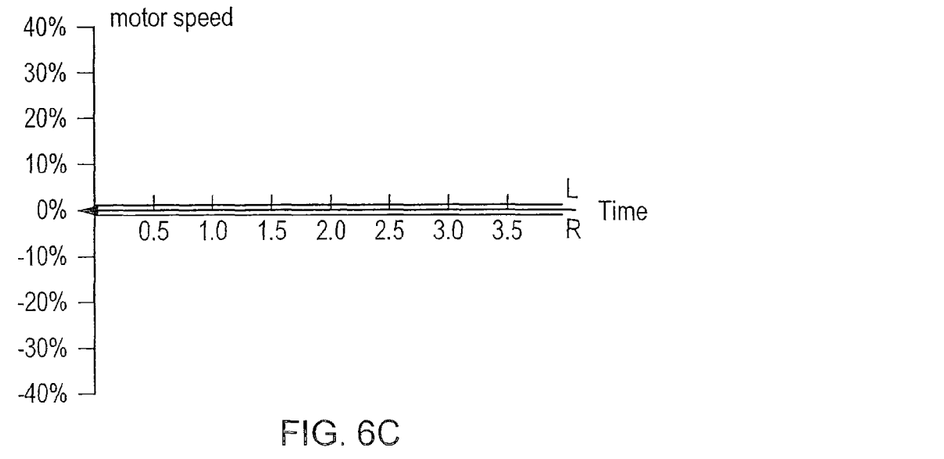

FIGS. 6A to 6C illustrate how motor voltage, motor current and motor speed, respectively, vary during a turning manoeuvre in a situation where the wheelchair experiences a loading condition, for a wheelchair where the speed assist circuitry of embodiments of the technology disclosed is not employed. In particular, as is apparent from FIG. 6C, the graphs illustrate a situation where the loading condition is such as to prevent the motors from turning, i.e. is a loading condition which the embodiments of the technology disclosed seek to address.

Assuming at time 0 the user fully deflects the joystick along its x axis to specify that the wheelchair should turn at the selected top speed setting, then it can be seen from the applied motor voltage graph of FIG. 6A that the voltage increases over the first couple of seconds towards a voltage of 10 volts applied to the left motor and a voltage of −10 volts applied to the right motor. The reason the voltage does not immediately transition to 10 volts is due to the damping occurring during step 225 of FIG. 3 that ensures that undue acceleration and deceleration rates are not observed. As shown in FIG. 6B, as the voltage rises, this also gives rise to an increase in the current through the motors, this current rising to a magnitude of approximately 28 amps between 2 and 2.5 seconds into the turning operation. However, as observed in FIG. 6C, this current has been insufficient to overcome the loading condition which is preventing the wheelchair from turning, and accordingly the motors do not turn and thus the wheelchair does not turn.

During these first few seconds of operation, the heat in the motors increases, which increases the resistance of the motors, and it is this increase in resistance that causes the current to tail off slightly after 2 to 2.5 seconds into the operation.

In the example illustrated in FIGS. 6A to 6C, it is assumed that IR compensation circuitry 60 is used, and accordingly IR compensation is being applied prior to generating the signals sent to the power stage circuit 55. However, as discussed previously, the programmed resistance $R_m$ used for such IR compensation techniques is intentionally set relatively low to compensate for variation in the resistance of the motors, and as a result a point is reached at around 2.5 seconds in to the process where the IR compensation approach will no longer further increase the voltage. As a result, a steady state is reached where significant current is being passed through the motors but that is insufficient to overcome the loading condition, and accordingly the motors continue not to turn, resulting in the wheelchair remaining stationary.

Figure 7A:
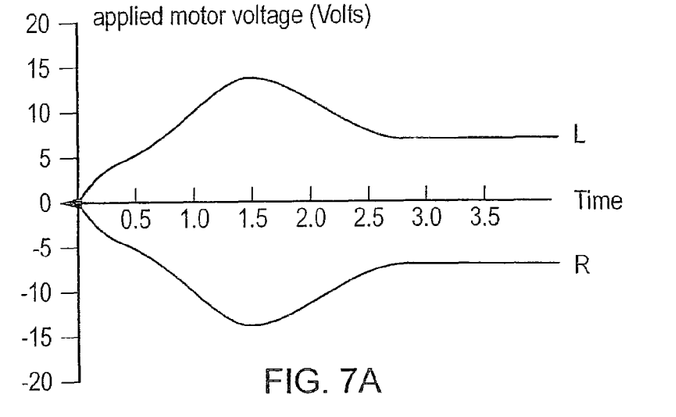
FIGS. 7A to 7C are graphs illustrating how motor voltage, motor current and motor speed vary under a loading condition during a turn operation in accordance with an embodiment of the technology disclosed.
Figure 7B:
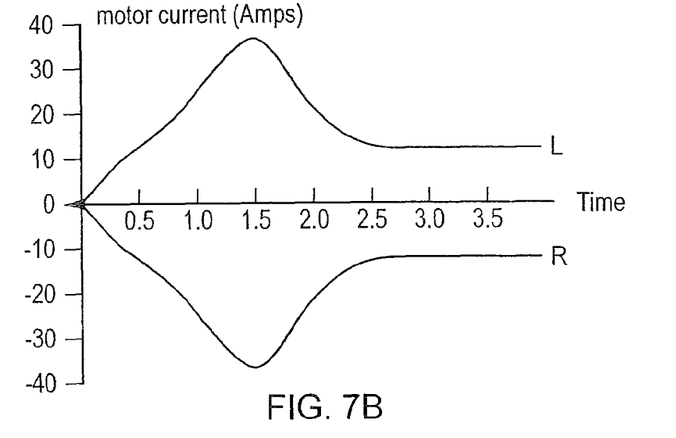
Figure 7C:
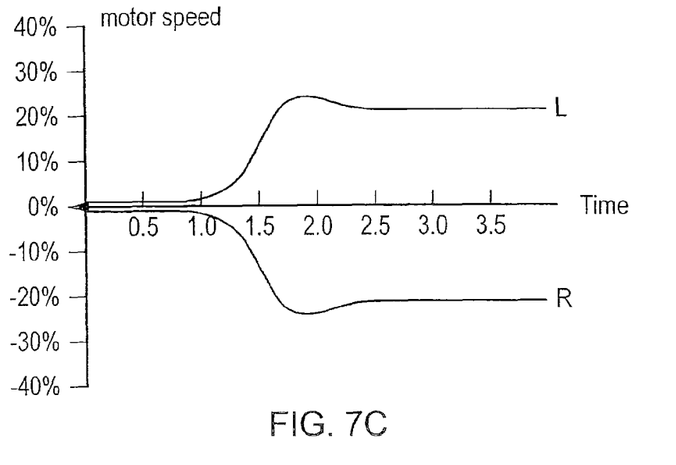

FIGS. 7A to 7C provide an equivalent set of graphs for the same scenario, but for a wheelchair where the speed assist circuitry 75 is utilised. For the first 0.5 seconds or so, the motor voltage and motor current increase in the same manner as illustrated earlier in FIGS. 6A and 6B, since the application of the turn speed assist function during that period has little or no effect. However, after approximately 0.5 seconds, the application of the turn speed assist function causes a boost in the minimum top turn speed, which in turn boosts the top turn speed setting selected by the user. As a result, this causes the voltage applied to the motors to increase as shown in FIG. 6A up to a peak just prior to 1.5 seconds after the joystick is deflected fully on its x axis. During this time, the current applied to the motors increases rapidly to a peak having a magnitude near 40 amps. As the current reaches its maximum, it becomes sufficient to overcome the loading condition which has prevented the motors from turning, and the motors start to turn in opposing directions, causing the wheelchair to start to turn. As the wheelchair starts to turn, and the effect of the loading condition reduces, then the current demand of the motors naturally starts to fall away, and by virtue of the turn speed assist function this will result in a reduction of the turn speed assist scalar, which in turn will allow the minimum top turn speed to begin to reduce. This in turn will cause the voltage applied to the motors to begin to be reduced.

As shown in FIGS. 7A to 7C, by about 2.5 seconds into the process, a steady state is reached where a voltage of approximately 7.5 volts is being applied to each motor, causing a current of about 10 amps to be drawn in each motor, which in turn cause the motors to rotate at the desired speed of approximately 20% of full speed.

By comparison of FIGS. 7A to 7C with the earlier discussed FIGS. 6A to 6C, it can be seen that the effect of the speed assist circuitry is to rapidly boost the current supplied to the motors during the early stage of a turn operation in order to overcome the loading condition and allow the wheelchair to begin moving, whereafter the current then falls to a steady state level sufficient to enable the wheelchair to continue its turning motion. The initial resistive forces which were preventing the motors turning without the use of the speed assist circuitry (see FIG. 6C) are hence rapidly overcome through use of the speed assist circuitry, providing significantly improved control and manoeuvrability of the wheelchair.

In accordance with the techniques described above, the speed assist circuitry is used to dynamically and automatically modify the minimum turning speed of the wheelchair, as a function of the total current in the two motors 40, 45. Specifically, as the total motor current increases, the minimum top turn speed setting also increases through application of the turn speed assist function described earlier with reference to FIGS. 4 and 5, which increases torque and has the effect of overcoming the force required to manoeuvre the wheelchair. Then, as the current falls (for example due to the castors realigning during a turning operation), the minimum top turning speed is naturally reduced (again through application of the turn speed assist function), close to its original value.

In order to accommodate a variety of applications, the function is made programmable in embodiments of the technology disclosed, through the programmability of a turn assist programmable value between 0 and 100. A programmable value of 0 has no effect, whilst values of 1 to 100 produce progressively stronger effects.

As discussed earlier, the function works practically due to the filtering that naturally occurs when modifying the speed setting. Although it can be classed as a positive feedback mechanism (similar to IR compensation), it works on a much slower time base suitable to the problem, and does not have the unwanted side effects of juddering that can occur when seeking to increase the sensitivity of IR compensation techniques. In essence, the speed assist function of embodiments of the technology disclosed fills in the inaccuracy gap created by IR compensation, but on a much slower time base.

It is possible that inaccuracies can still exist, due for example to the motors heating up and becoming less efficient through use. The speed assist function described above could in such situations be extended to allow for fluctuations in motor temperature, either by measuring the motor temperature directly, or by estimating it through a mathematical model. A combination of total motor current and operating temperature may then be used to determine an appropriate turn speed assist scalar for modifying the minimum top turn speed.

Although a particular embodiment has been described herein, it will be appreciated that the invention is not limited thereto and that many modifications and additions thereto may be made within the scope of the technology disclosed. For example, various combinations of the features of the following dependent claims could be made with the features of the independent claims without departing from the scope of the technology disclosed.

We claim:

1. A controller for a motorised vehicle, the motorised vehicle having at least two driven wheels driven independently by a motor arrangement, the controller comprising:
    an input interface arranged to receive a number of input signals from an operator input device of the motorised vehicle;
    a drive control circuitry, coupled to the input interface, for generating control signals for controlling the driving of said at least two driven wheels by the motor arrangement, said control signals being dependent on the input signals; and
    a speed assist circuitry, responsive to a loading condition that needs to be overcome, to boost at least one of the input signals dependent on an indication of current consumed in driving at least one of said at least two driven wheels, prior to use of said input signals by the drive control circuitry to generate said control signals;
    the drive control circuitry being responsive to said at least one of the input signals having been boosted by the speed assist circuitry to generate said control signals such that those control signals will boost top speed in order to seek to overcome said loading condition;
    the controller further comprising IR compensation circuitry arranged to perform IR compensation on the control signals output by the drive control circuitry prior to use of the control signals to control the driving of said at least two driven wheels;
    said input signals including a top speed setting selectable via the operator input device;
    the control signals generated by the drive control circuitry being dependent on the top speed setting, and
    responsive to said loading condition, said speed assist circuitry being arranged to boost said top speed setting selected via the operator input device.

2. A controller as claimed in claim 1, wherein:
    the top speed setting is selectable between a minimum top speed setting and a maximum top speed setting; and
    the speed assist circuitry is arranged, responsive to said loading condition, to raise the minimum top speed setting to create a new minimum top speed setting, such that the amount of boost applied to the top speed setting selected via the operator input device is dependent on the value of that selected top speed setting.

3. A controller as claimed in claim 2, wherein the speed assist circuitry is arranged to calculate the new minimum top speed setting by multiplying the minimum top speed setting by a scalar of at least one, the value of the scalar increasing as the current consumed in driving at least one of the at least two driven wheels increases.

4. A controller as claimed in claim 3, further comprising a storage for storing a programmable value, the rate at which the value of the scalar increases as the current consumed in driving at least one of the at least two driven wheels increases being dependent on said programmable value.

5. A controller as claimed in claim 3, wherein the value of the scalar increases linearly with increase in the current consumed in driving at least one of the at least two driven wheels.

6. A controller as claimed in claim 2, wherein when calculating the new minimum top speed setting, the speed assist circuitry restricts the new minimum top speed setting so as not to exceed the maximum speed attainable through said at least two driven wheels.

7. A controller as claimed in claim 2, wherein if the new minimum top speed setting exceeds the maximum top speed setting, the speed assist circuitry is arranged to set the maximum top speed setting to be equal to the new minimum top speed setting.

8. A controller as claimed in claim 1, wherein the speed assist circuitry is arranged only to detect occurrence of the loading condition if at least one predetermined condition exists.

9. A controller as claimed in claim 8, wherein said at least one predetermined condition comprises a condition under which the at least two driven wheels are being driven so as to apply a turning force to the motorised vehicle.

10. A controller as claimed in claim 9, wherein the motor arrangement comprises at least two independent motors for driving said at least two driven wheels, and the at least two driven wheels are driven so as to apply said turning force to the motorised vehicle by driving the at least two independent motors in opposite directions to each other.

11. A controller as claimed in claim 10, wherein the indication of current provided to the speed assist circuitry is an indication of a sum of the absolute value of current consumption in each of said at least two independent motors.

12. A controller as claimed in claim 1, wherein said top speed setting selectable via the operator input device comprises a top turn speed setting, and responsive to said loading condition, said speed assist circuitry is arranged to boost the top turn speed setting selected via the operator input device.

13. A controller as claimed in claim 12, wherein:
    the top turn speed setting is selectable between a minimum top turn speed setting and a maximum top turn speed setting; and
    the speed assist circuitry is arranged, responsive to said loading condition, to raise the minimum top turn speed setting to create a new minimum top turn speed setting, such that the amount of boost applied to the top turn speed setting selected via the operator input device is dependent on the value of that selected top turn speed setting.

14. A controller as claimed in claim 1, wherein the speed assist circuitry is responsive to both said indication of current consumed in driving at least one of said at least two driven wheels, and one or more predetermined operational parameters when boosting said at least one of the input signals.

15. A controller as claimed in claim 14, wherein said one or more predetermined operational parameters comprise an indication of operating temperature of one or more motors of the motor arrangement used to drive said at least two driven wheels.

16. A controller as claimed in claim 1, wherein said speed assist circuitry detects said loading condition when the current consumed in driving at least one of said at least two driven wheels increases.

17. A controller as claimed in claim 16, wherein said loading condition arises due to friction between at least one of said at least two driven wheels and a surface on which the motorised vehicle is placed when seeking to turn the motorised vehicle increasing the loading on at least one of said at least two driven wheels.

18. A controller as claimed in claim 16, wherein said loading condition arises due to a required re-alignment of castor wheels of the motorised vehicle when seeking to turn the motorised vehicle increasing the loading on at least one of said at least two driven wheels.

19. A controller as claimed in claim 16, wherein said loading condition arises due to weight of the operator increasing the loading on at least one of said at least two driven wheels.

20. A controller as claimed in claim 16, wherein said loading condition arises due to contact of the motorised vehicle with an abrupt change in contour of said surface on which the motorised vehicle is placed increasing the loading on at least one of said at least two driven wheels.

21. A controller as claimed in claim 1, for use in a motorised vehicle taking the form of a wheelchair.

22. A controller as claimed in claim 1, wherein the speed assist circuitry is arranged to boost said at least one of the input signals having regard to an indication of total current consumed in all of said at least two driven wheels.

23. A controller as claimed in claim 1, wherein the drive control circuitry is configured to apply a sequence of operations including a demand damping operation to generate said control signals from the input signals.

24. A motorised vehicle comprising:
a motor arrangement;
at least two driven wheels driven independently by said motor arrangement;
an operator input device via which an operator issues a number of input signals;
a drive control circuitry for generating control signals for controlling the driving of said at least two driven wheels by the motor arrangement, said control signals being dependent on the input signals; and
a speed assist circuitry, responsive a loading condition that needs to be overcome, to boost at least one of the input signals dependent on an indication of current consumed in driving at least one of said at least two driven wheels, prior to use of said input signals by the drive control circuitry to generate said control signals;
the drive control circuitry being responsive to said at least one of the input signals having been boosted by the speed assist circuitry to generate said control signals such that those control signals will boost top speed in order to seek to overcome said loading condition;
the motorised vehicle further comprising IR compensation circuitry arranged to perform IR compensation on the control signals output by the drive control circuitry prior to use of the control signals to control the driving of said at least two driven wheels;
said input signals including a top speed setting selectable via the operator input device;
the control signals generated by the drive control circuitry being dependent on the top speed setting; and
responsive to said loading condition, said speed assist circuitry being arranged to boost said top speed setting selected via the operator input device.

25. A motorised vehicle as claimed in claim 24, wherein said motorised vehicle is a wheelchair.

26. A method of controlling a motorised vehicle having at least two driven wheels driven independently by a motor arrangement, comprising:
receiving a number of input signals from the operator input device of the motorised vehicle, including a top speed setting selectable via the operator input device;
generating control signals for controlling the driving of said at least two driven wheels by the motor arrangement, said control signals being dependent on the input signals including the top speed setting;
responsive to a loading condition that needs to be overcome, boosting at least one of the input signals dependent on an indication of current consumed in driving at least one of said at least two driven wheels, prior to use of said input signals in said control signal generating step, said boosting comprising boosting said top speed setting selected via the operator input device;
during said control signal generating step, being responsive to said at least one of the input signals having been boosted to generate said control signals such that those control signals will boost top speed in order to seek to overcome said loading condition; and
the method further comprising the step of performing IR compensation on the control signals output by the control signal generating step prior to use of the control signals to control the driving of said at least two driven wheels.

27. A non-transitory computer readable storage medium carrying a computer program executable on a computing device to cause a motorised vehicle having at least two driven wheels driven independently by a motor arrangement to be controlled on execution on said computing device, code portions of the computer program being arranged:
to receive a number of input signals from an operator input device of the motorised vehicle, including a top speed setting selectable via the operator input device;
to generate control signals for controlling the driving of said at least two driven wheels by the motor arrangement, said control signals being dependent on the set of input signals including the top speed setting;
responsive to a loading condition that needs to be overcome, to boost at least one of the input signals dependent on an indication of current consumed in driving at least one of said at least two driven wheels, prior to use of said input signals in said control signal generating step, said boosting comprising boosting said top speed setting selected via the operator input device;
during said control signal generating step, to be responsive to said at least one of the input signals having been boosted to generate said control signals such that those control signals will boost top speed in order to seek to overcome said loading condition; and
to additionally perform IR compensation on the control signals output by the control signal generating step prior to use of the control signals to control the driving of said at least two driven wheels.

28. A controller for a motorised vehicle having at least two driven wheels driven independently by a motor arrangement, the controller being arranged to receive a number of input signals from an operator input device of the motorised vehicle, the controller comprising:

drive control means for generating control signals for controlling the driving of said at least two driven wheels by the motor arrangement, said control signals being dependent on the input signals; and speed assist means, responsive to a loading condition that needs to be overcome, to boost at least one of the input signals dependent on an indication of current consumed in driving at least one of said at least two driven wheels, prior to use of said input signals by the drive control means to generate said control signals;

the drive control means being responsive to said at least one of the input signals having been boosted by the speed assist means, for generating said control signals such that those control signals will boost top speed in order to seek to overcome said loading condition;

the controller further comprising IR compensation means for performing IR compensation on the control signals output by the drive control means prior to use of the control signals to control the driving of said at least two driven wheels;

said input signals including a top speed setting selectable via the operator input device;

the control signals generated by the drive control means being dependent on the top speed setting; and responsive to said loading condition, said speed assist means being arranged to boost said top speed setting selected via the operator input device.

* * * * *